United States Patent
Noguchi

(10) Patent No.: US 6,940,648 B2
(45) Date of Patent: Sep. 6, 2005

(54) OPTICAL LOW PASS FILTER

(75) Inventor: Masato Noguchi, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/801,652

(22) Filed: Mar. 17, 2004

(65) Prior Publication Data

US 2004/0184149 A1 Sep. 23, 2004

(30) Foreign Application Priority Data

Mar. 19, 2003 (JP) .......................................... 2003-074983

(51) Int. Cl.$^7$ ........................... G02B 27/28; G02B 5/30
(52) U.S. Cl. ...................... 359/497; 359/494; 359/495; 359/498; 348/290; 348/342
(58) Field of Search ................................ 359/494–498, 359/501; 348/290, 342

(56) References Cited

U.S. PATENT DOCUMENTS

| | | | | |
|---|---|---|---|---|
| 5,069,530 A | * | 12/1991 | Nishida et al. | ............. 359/498 |
| 5,452,129 A | * | 9/1995 | Shiraishi | ..................... 359/497 |
| 5,471,343 A | * | 11/1995 | Takasugi | .................... 359/494 |
| 5,477,381 A | * | 12/1995 | Sasaki et al. | ............... 359/497 |
| 5,940,127 A | * | 8/1999 | Nakajima | .................... 348/342 |
| 6,724,531 B2 | * | 4/2004 | Oono | ......................... 359/497 |
| 2001/0080826 | | 4/2004 | Noguchi | |

FOREIGN PATENT DOCUMENTS

| JP | 2840619 | 10/1998 |
|---|---|---|
| JP | 2000-56268 | 2/2000 |

* cited by examiner

Primary Examiner—Leonidas Boutsikaris
(74) Attorney, Agent, or Firm—Greenblum & Bernstein, P.L.C.

(57) ABSTRACT

There is provided an optical low pass filter, which is provided with a first birefringence plate that divides an incident ray into two rays, a second birefringence plate that divides an incident ray into two rays, and a third birefringence plate that divides an incident ray into two rays. The first birefringence plate, the second birefringence plate and the third birefringence plate are cemented to each other, light passed through the first birefringence plate passing through the second birefringence plate and then passing through the third birefringence plate. Further, a separation angle θs, representing a difference between separation directions in which adjacent ones of the first, second and third birefringence plates divide their respective incident rays, satisfies a condition 46°≦θs≦60°.

5 Claims, 10 Drawing Sheets

OPTICAL LOW PASS FILTER

BACKGROUND OF THE INVENTION

The present invention relates to an optical low pass filter (OLPF) provided in an imaging apparatus such as a digital camera.

Recently, digital cameras have been widespread. For digital cameras employing solid-state imaging elements, such as a CCD (Charge Coupled Device), used as an imaging surface, it is important to avoid a moiré effect or an occurrence of false colors.

For this purpose, an optical low pass filter (OLPF) is generally provided between a photographing lens (i.e., an imaging optical system) and the imaging surface so that the high spatial frequency components are removed from an image formed on the imaging surface.

Generally, the imaging element, or the CCD is formed to have a rectangular shape, and a plurality of pixels are arranged at regular interval, in a matrix, along longer and shorter sides of the rectangular shape. In this specification, the term "horizontal direction" refers to a direction corresponding to the longer side of the rectangular imaging element (e.g., CCD), and the "vertical direction" refers to a direction corresponding to the shorter side of the imaging element.

A conventional OLPF is configured to have three cemented birefringence plates (which will be referred to as a three-element OLPF), or two birefringence plates with a predetermined wavelength plate sandwiched therebetween.

A Japanese Patent Provisional Publication No. 2000-56268 (hereafter, referred to as a document 1) discloses a conventional three-element OLPF. The three-element OLPF disclosed in the document 1 has three birefringence plates having separation directions of 0°, +45° and −45°, respectively with respect to the horizontal direction. In general, the separation direction in which a divided ray is directed is represented by an angle with respect to the horizontal direction.

FIG. 9 is an MTF (Modulation Transfer Function) map illustrating an effect of the conventional three-element OLPF. In FIG. 9, a horizontal axis and a vertical axis indicate normalized values of spatial frequencies. Specifically, the horizontal axis in the MTF map of FIG. 9 represents the spatial frequencies in the horizontal direction (X direction), and the vertical axis in the MTF map of FIG. 9 represents the spatial frequency in the vertical direction (Y direction). In FIG. 9, a region A transmits light with a highest transmittance (MTF value: 0.8–1), a region B has a second highest transmittance (MTF value: 0.6–0.8), a region C has a third highest transmittance (MTF value: 0.4–0.6), and a region D has a fourth highest transmittance (MTF value 0.2–0.4). A region E hardly transmits light (MTF value: 0.0–0.2). Note that the definition of the regions A–E applies in all the MTF maps in this specification.

In the conventional OLPF having a characteristic shown in FIG. 9, each of the regions A–D is formed substantially symmetrically both in the vertical direction and horizontal directions. With this configuration, the high spatial frequency components can be eliminated both in the vertical direction and in the horizontal direction in a similar manner. The way the transmitting regions (i.e., the regions A–D) expand will be referred to as a cut-off directionality. The conventional OLPF having the characteristic shown in FIG. 9 has an excellent cut-off directionality such that the characteristic thereof has little direction dependency.

As shown in FIG. 9, the region E in the three-element OLPF disclosed in the document 1 is relatively small. That is, the normalized frequency component of −0.4 or less, or +0.4 or more is not sufficiently suppressed. The function of suppressing/eliminating the high spatial frequency components provided by the OLPF will be referred to as a cut-off function.

As described above, the three-element OLPF disclosed in the document 1 does not have a sufficient cut-off function, although the three-element OLPF has an excellent cut-off directionality. Therefore, the three-element OLPF passes undesired frequency components, which may deteriorate the quality of the image.

A Japanese Patent No. 2840619 (hereafter, referred to as a document 2) discloses a conventional three-element OLPF in which three birefringence plates having separation angles of −45°, 0° and +45°, respectively are provided.

FIG. 10 shows the MTF map of the three-element OLPF disclosed in the document 2. By making a comparison between FIG. 10 and FIG. 9, it is understood that the region E of the OLPF shown in FIG. 10 is relatively large, i.e., the OLPF shown in FIG. 10 has an excellent cut-off function.

However, the regions A–D expand greater in one direction (the direction PL in FIG. 10) than another direction (the direction PS) which is perpendicular to the direction PL. When this OLPF is used, the degree of blur in the PL direction is smaller than the degree of blur in the PS direction. That is, the cut-off directionality of the OLPF in document 2 is inferior to the cut-off directionality of the OLPF in document 1.

In the following description, when the MTF maps are referred to, the direction in which each region (A, B, C and D) expands greatest is indicated as the direction PL, and the direction in which each region expands smallest is indicated as the PS direction.

As described above, the three-element OLPF disclosed in the document 2 does not have a sufficient cut-off directionality, although it has an excellent cut-off function. Therefore, when the three-element OLPF of document 2 is employed, although the excellent cut-off function is expected, due to the lopsided cut-off directionality, the quality of a captured image is lowered since the resolution of the captured image differs depending on the direction.

SUMMARY OF THE INVENTION

The present invention is advantageous in that it provides a three-element optical low pass filter which has both an excellent cut-off function and an excellent cut-off directionality.

According to an aspect of the invention, there is provided an optical low pass filter, which is provided with a first birefringence plate that divides an incident ray into two rays, a second birefringence plate that divides an incident ray into two rays, and a third birefringence plate that divides an incident ray into two rays. In this structure, the first birefringence plate, the second birefringence plate and the third birefringence plate are cemented to each other, light passed through the first birefringence plate passing through the second birefringence plate and then passing through the third birefringence plate. Further, a separation angle $\theta s$, representing a difference between separation directions in which adjacent ones of the first, second and third birefringence plates divide their respective incident rays, satisfies a condition:

$$46° \leq \theta s \leq 60°.$$

With this configuration, both an excellent cut-off function and an excellent directionality are enhanced.

Optionally, the separation angle θs may satisfy a condition:

$$46° \leq \theta s \leq 52°.$$

Still optionally, when a separation amount, representing a distance by which the two rays divided by one of the first, second and third birefringence plates are away with respect to each other, is denoted by δ1 for the first birefringence plate, the separation amount for the second birefringence plate is denoted by δ2, and the separation amount for the third birefringence plate is denoted by δ3, the optical low pass filter may satisfy a condition:

$$\delta 1 = \delta 3 \neq \delta 2.$$

Still optionally, the separation amount for the second birefringence plate δ2 may satisfy a condition:

$$0.5 \cdot \delta 1 \leq \delta 2 < 1.0 \cdot \delta 1.$$

In a particular case, the separation angle θs may be defined by a following equation:

$$\theta s = |\theta 1 - \theta 2| = |\theta 2 - \theta 3|,$$

where θ1 is an angle that the separation direction in which the first birefringence plate divides its incident ray forms with respect to a horizontal direction corresponding to a longer side of a rectangular shape of an imaging element to be used together with the optical low pass filter, θ2 is an angle that the separation direction in which the second birefringence plate divides its incident ray forms with respect to the horizontal direction, and θ3 is an angle that the separation direction in which the third birefringence plate divides its incident ray forms with respect to the horizontal direction.

BRIEF DESCRIPTION OF THE ACCOMPANYING DRAWINGS

FIG. 1 schematically shows a configuration of an optical low pass filter (OLPF) according to an embodiment of the invention;

DETAILED DESCRIPTION OF THE EMBODIMENTS

Hereinafter, an embodiment according to the invention is described with reference to the accompanying drawings.

Figure 1:
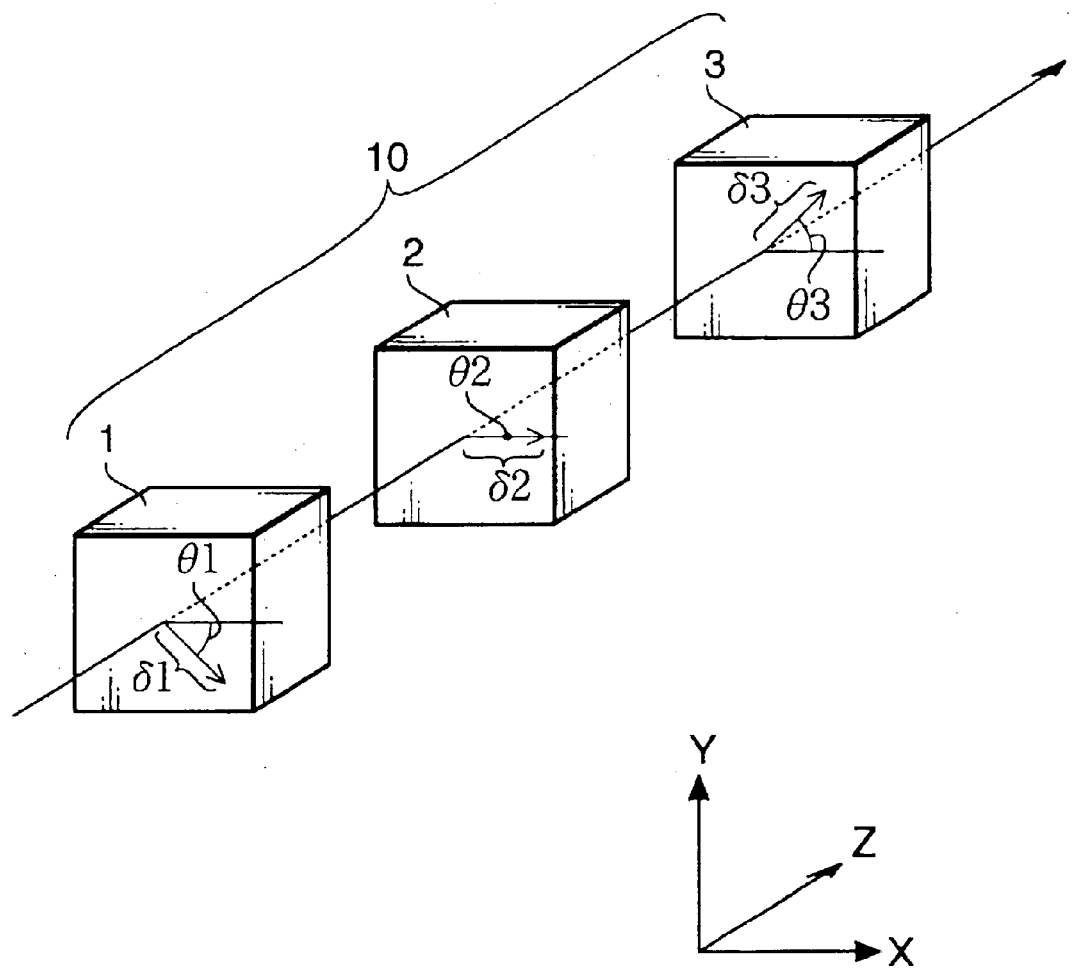

FIG. 1 schematically shows a configuration of an optical low pass filter (OLPF) 10 according to an embodiment of the invention. As shown in FIG. 1, the OLPF 10 has three birefringence plates 1–3, each of which divides an incident ray into two rays.

In the following explanation, a separation amount is used to represent a distance by which a divided ray is away from an incident ray. Further, the separation direction is negative when a direction in which a divided ray is directed (see arrows designated by symbols δ1, δ2 and δ3) is rotated clockwise with respect to the horizontal direction, and the separation direction is positive when the direction in which the divided ray is directed is rotated counterclockwise with respect to the horizontal direction.

As shown in FIG. 1, the first birefringence plate 1 has the separation direction of θ1 and a separation amount of δ1. The second birefringence plate 2 has the separation direction of θ2 and the separation amount of δ2. The third birefringence plate 3 has the separation direction of θ3 and the separation amount of δ3.

In FIG. 1, a configuration, in which the separation direction θ1 is negative, the separation direction θ2 is 0° and the separation direction θ3 is positive, is shown by way of example. In FIG. 1, the three birefringence plates 1–3 are separated for convenience of explanation. However, in actuality, the three birefringence plates 1–3 are cemented to each other.

In general, the cut-off function and the cut-off directionality of the OLPF is determined by an angle formed between separation directions of adjacent birefringence plates (hereafter, referred to as a separation angle) and the separation amount of each birefringence plate. When the separation angle is represented by a symbol θs, the angle θs is determined according to a following equation (1).

$$\theta s = |\theta 1 - \theta 2| = |\theta 2 - \theta 3| \qquad (1)$$

The angle θs is regarded as an angle having a range of 0° through 90°.

As described below, the OLPF 10 according to the embodiment of the invention is configured to have both an excellent cut-off function and an excellent directionality. Hereafter, a detailed explanation to attain such optical performance will be made with reference to the drawings.

The separation angle θs of the OLPF 10 satisfies a condition (2).

$$46° \leq \theta s \leq 60° \qquad (2)$$

Figure 2:
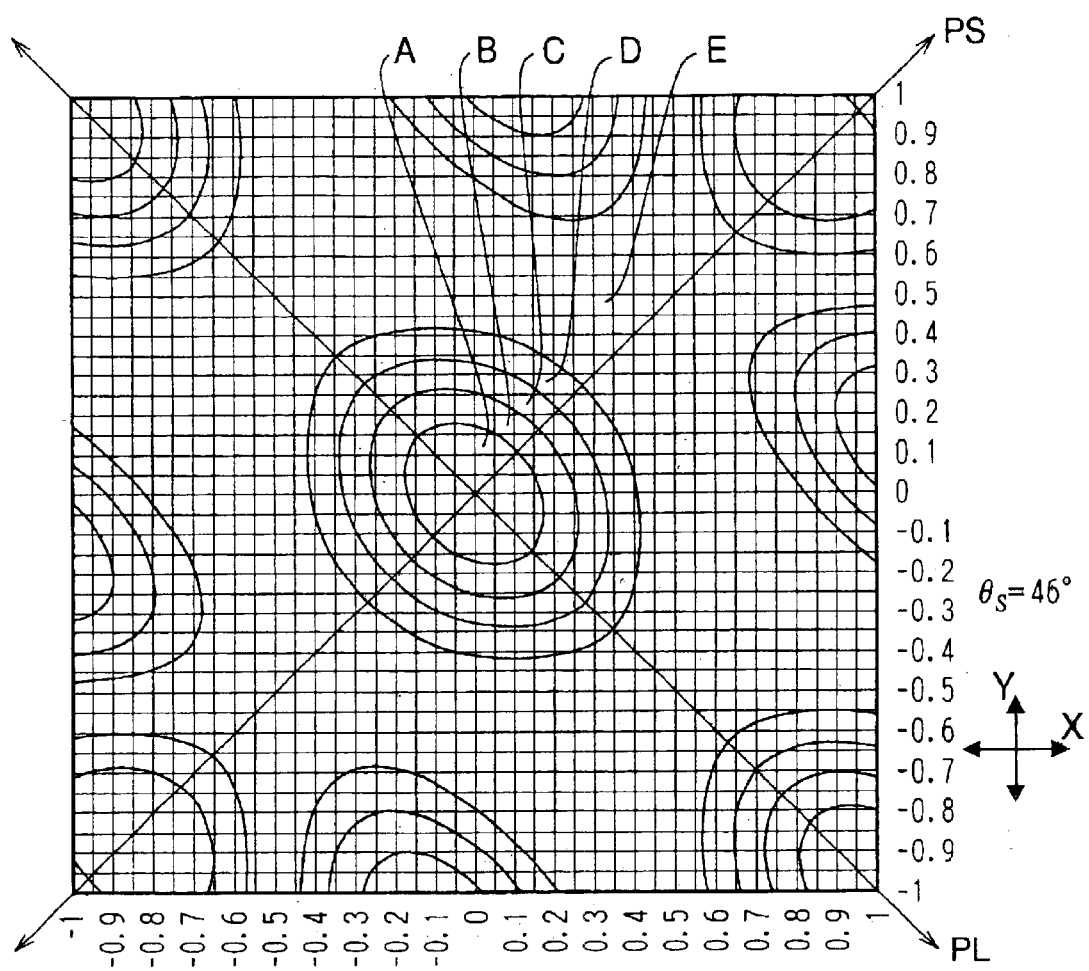
FIG. 2 shows a MTF map when a separation angle of the OLPF according to the embodiment is set to be 46°.
Figure 9:
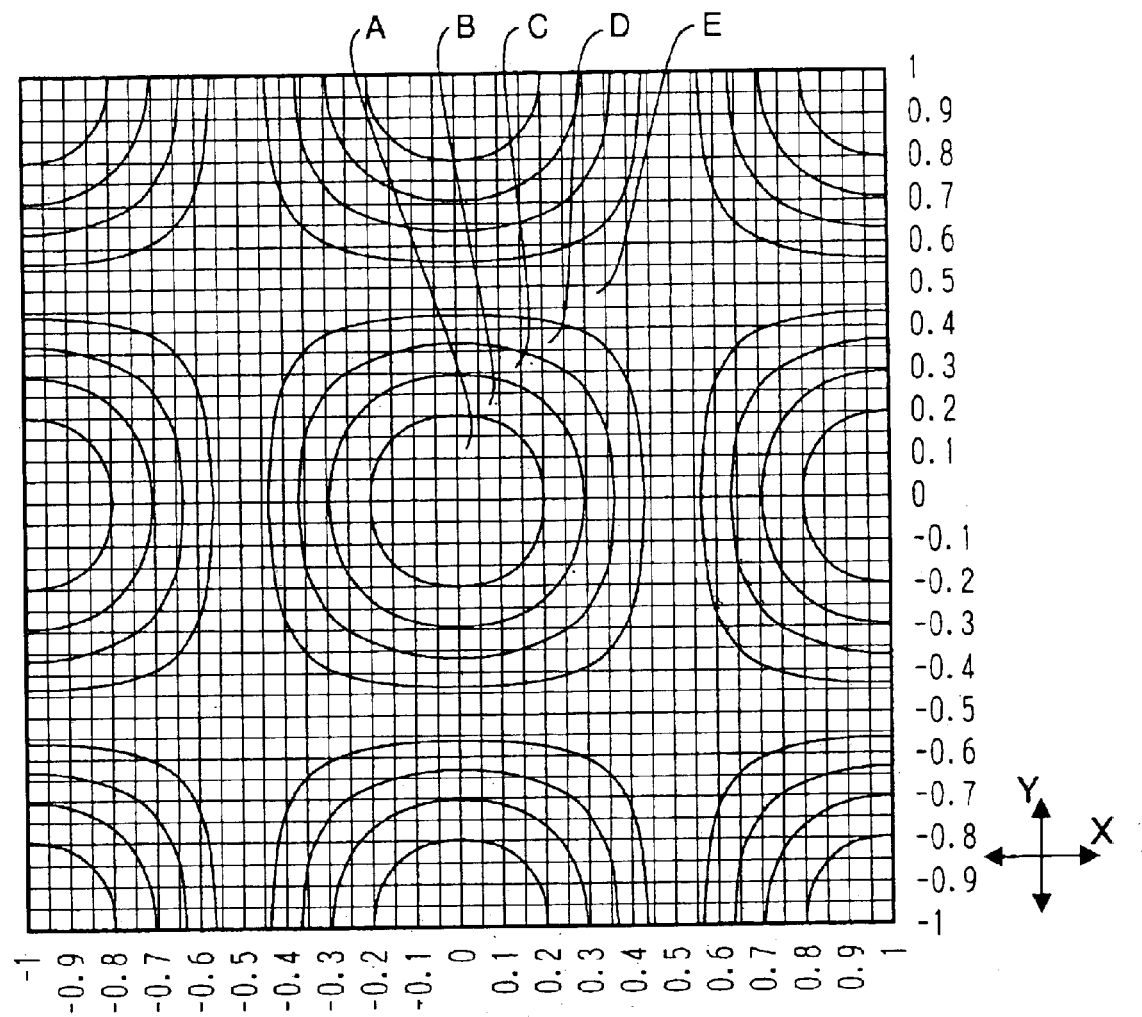
FIG. 9 shows an MTF map illustrating of one of conventional three-element OLPFs.
Figure 10:
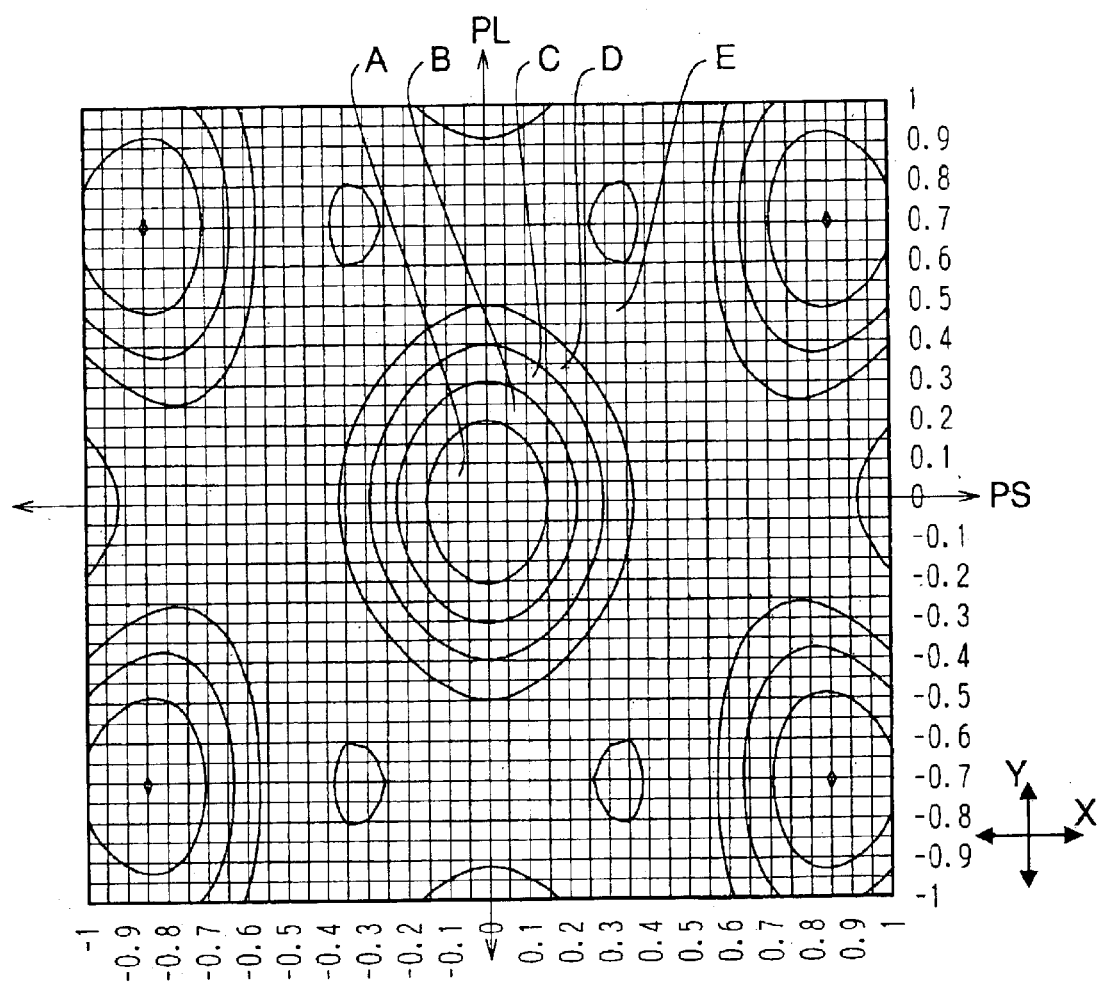
FIG. 10 shows an MTF map of one of the conventional three-element OLPFs.

FIG. 2 shows a MTF map when the separation angle θs of the OLPF 10 is set to be 46°, i.e., when the separation directions of θ1, θ2 and θ3 of the OLPF 10 are set to be 0°, 46° and 92°, respectively. By making a comparison between FIG. 2 and FIG. 9, it is understood that the region E of the OLPF 10 according to the embodiment is larger than that of the conventional OLPF shown in FIG. 9. Further, as shown in the MTF map of FIG. 2, the regions D scattering over the region E in the MTF map of the conventional OLPF shown in FIG. 10 are eliminated.

By satisfying the condition (2), the OLPF 10 according to the embodiment can attain not only the enhanced cut-off directionality but also the cut-off function better than that of the conventional OLPF.

Figure 3:
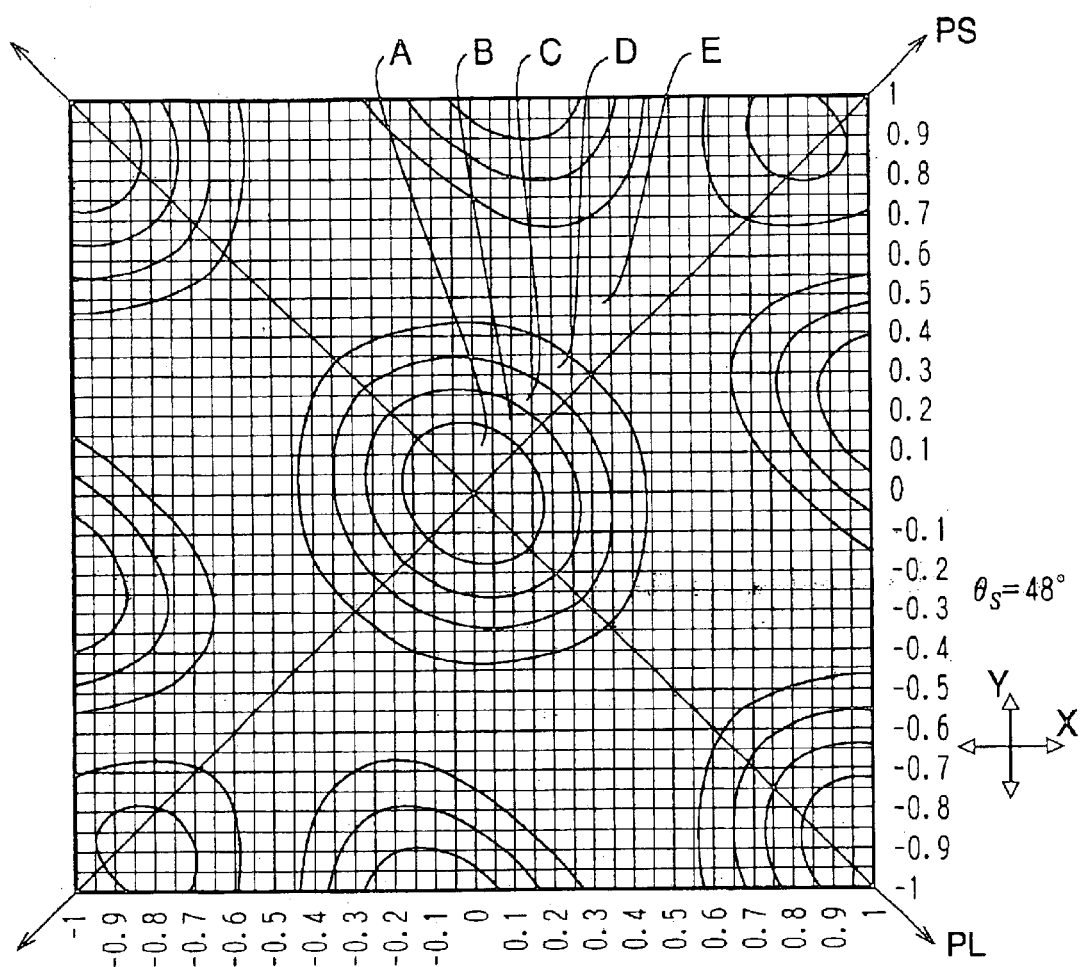
FIG. 3 shows a MTF map when the separation angle of the OLPF according to the embodiment is set to be 48°.
Figure 4:
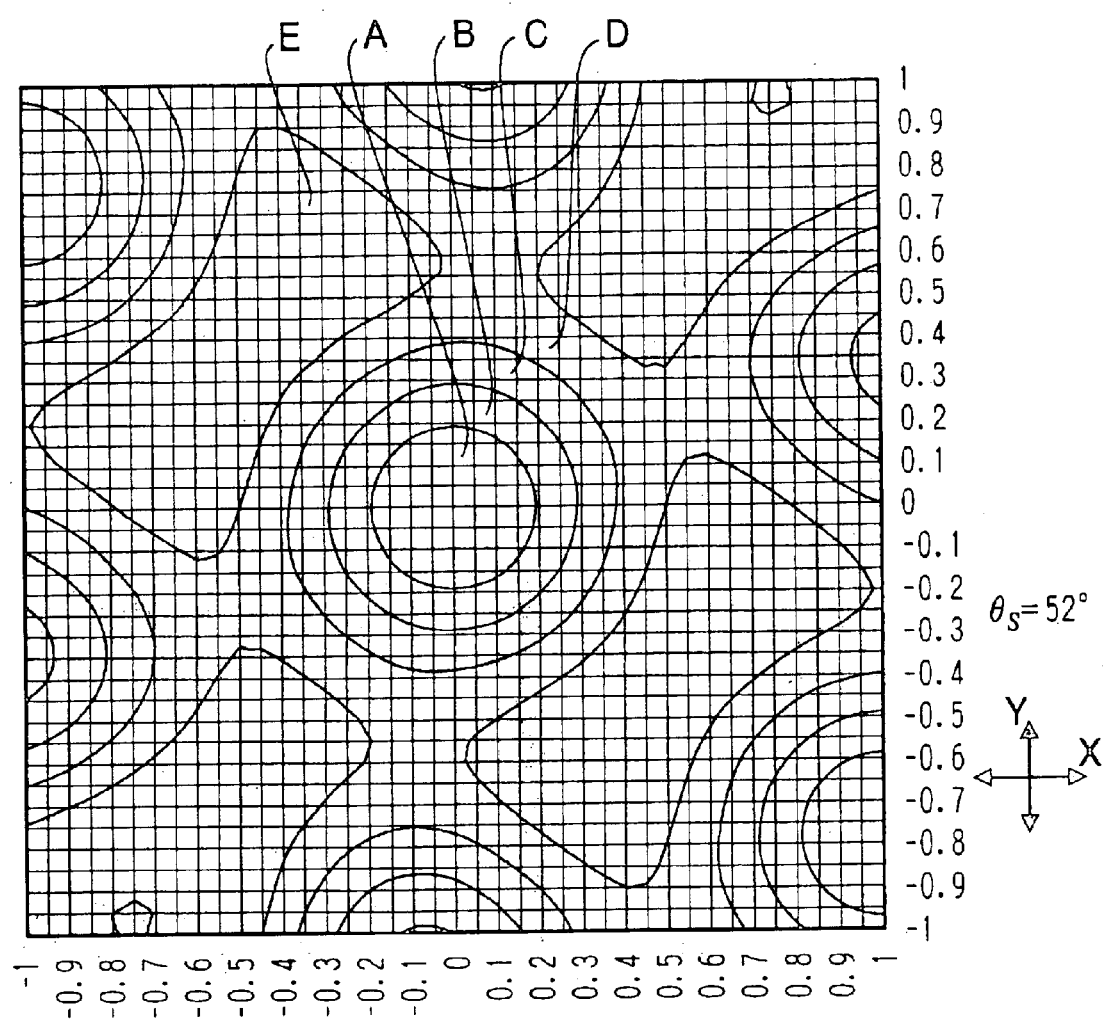
FIG. 4 shows a MTF map when the separation angle of the OLPF according to the embodiment is set to be 52°.
Figure 5:
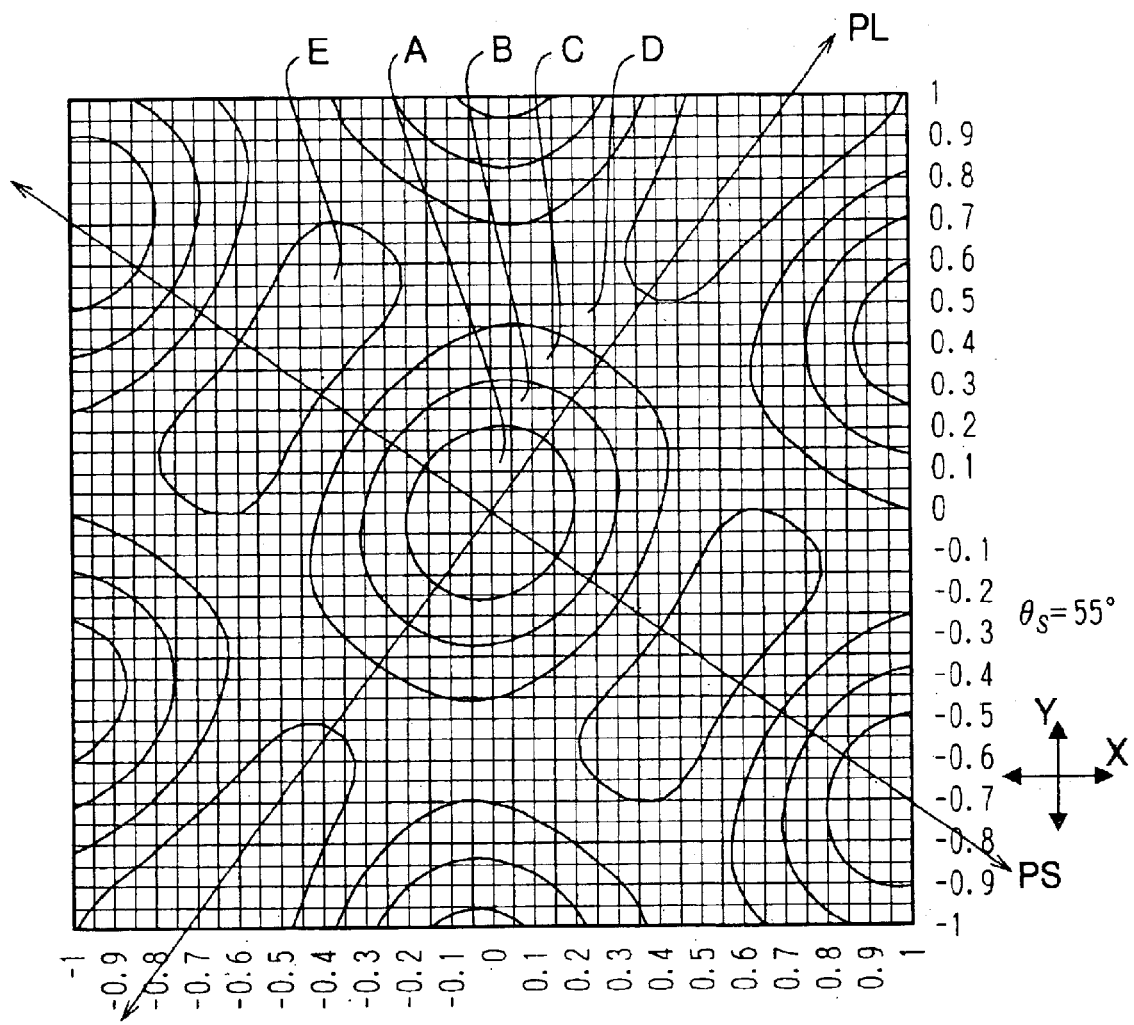
FIG. 5 shows a MTF map when the separation angle of the OLPF according to the embodiment is set to be 55°.

FIG. 3 shows a MTF map when the separation angle θs of the OLPF 10 is set to be 48°, i.e., when the separation directions of θ1, θ2 and θ3 of the OLPF 10 are set to be 0°, 48° and 96°, respectively. FIG. 4 shows a MTF map when the separation angle θs of the OLPF 10 is set to be 52°, i.e., when the separation directions of θ1, θ2 and θ3 of the OLPF 10 are set to be 0°, 52° and 104°, respectively. FIG. 5 shows a MTF map when the separation angle θs of the OLPF 10 is set to be 55°, i.e., when the separation directions of θ1, θ2 and θ3 of the OLPF 10 are set to be 0°, 55° and 110°, respectively.

As can be seen from FIGS. 2–5, the difference between the size in the PL direction and the size in the PS direction of each of the regions A–D decreases, as the separation angle θs increases from 46°. That is, by gradually increasing the separation angle θs from 46°, the cut-off directionality can be further enhanced. With regard to cut-off directionality, the OLPF 10 inhibits the optimal symmetric property in each region when the separation angle θs is set to be 60°.

However, as shown in FIGS. 4 and 5, when the separation angle is set to be 52° or more, the region D becomes larger than the region E in each MTF map. This tendency becomes clearer when the separation angle θs is set to an angle more than 60°. For this reason, the upper limit of the condition (2) is set to be 60°.

To further enhance the cut-off function and the cut-off directionality, the OLPF 10 may be configured to satisfy a condition (3).

$$46° \leq θs \leq 52° \qquad (3)$$

For example, the OLPF 10 having the separation angle of 48° has larger region E than the OLPF 10 having the separation angle of 45°. Further, the difference between the size in the PL direction and the size in the PS direction of each of the regions A–D of the OLPF 10 having the separation angle of 48° is sufficiently small and is substantially the same as that of the OLPF having the separation angle of 90°. Thus, the OLPF 10 having the separation angle of 48° exhibits further enhanced performance in which a balance between the cut-off function and the cut-off directionality is achieved.

It is also possible to adjust the cut-off directionality and the cut-off function by changing each of the separation amounts of the birefringence plates 1–3. More specifically, by making the separation amount δ1 of the first birefringence plate 1 and the separation amount δ3 of the third birefringence plate 3 equal to each other, distortions of the shapes of the regions A–D in the MTF map can be sufficiently suppressed, and therefore the excellent cut-off directionality can be kept.

Further, as described in detail below, by changing the separation amount δ2 of the second birefringence plate 2 relative to the other separation amounts δ1 and δ3 (which have been set equal to each other), the cut-off function and the cut-off directionality can be adjusted. That is, the OLPF 10 according to the embodiment may be configured to satisfy a condition (4).

$$δ1=δ3 \neq δ2 \qquad (4)$$

Figure 6:
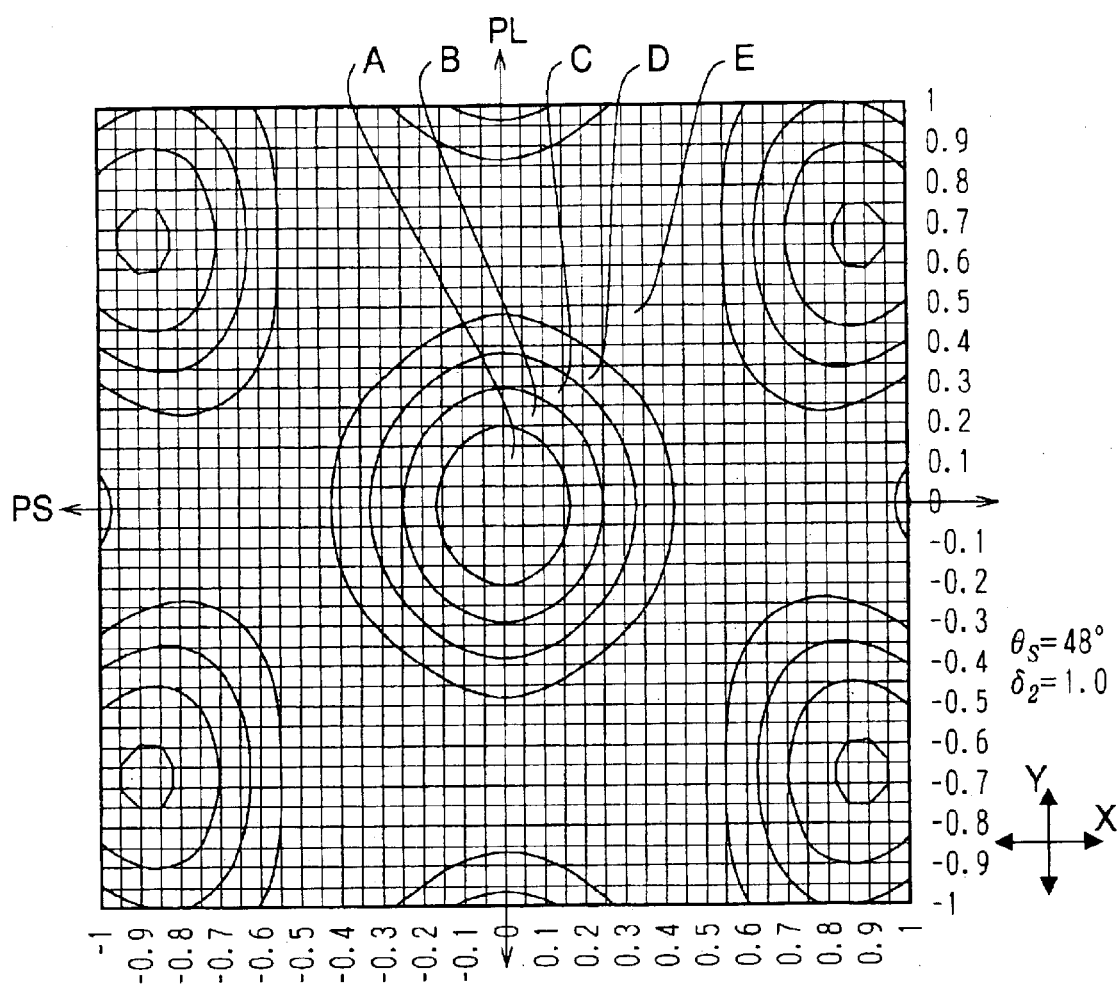
FIG. 6 shows a MTF map of the OLPF according to the embodiment when the separation angle is 48° and the a separation amount is 1.0.
Figure 7:
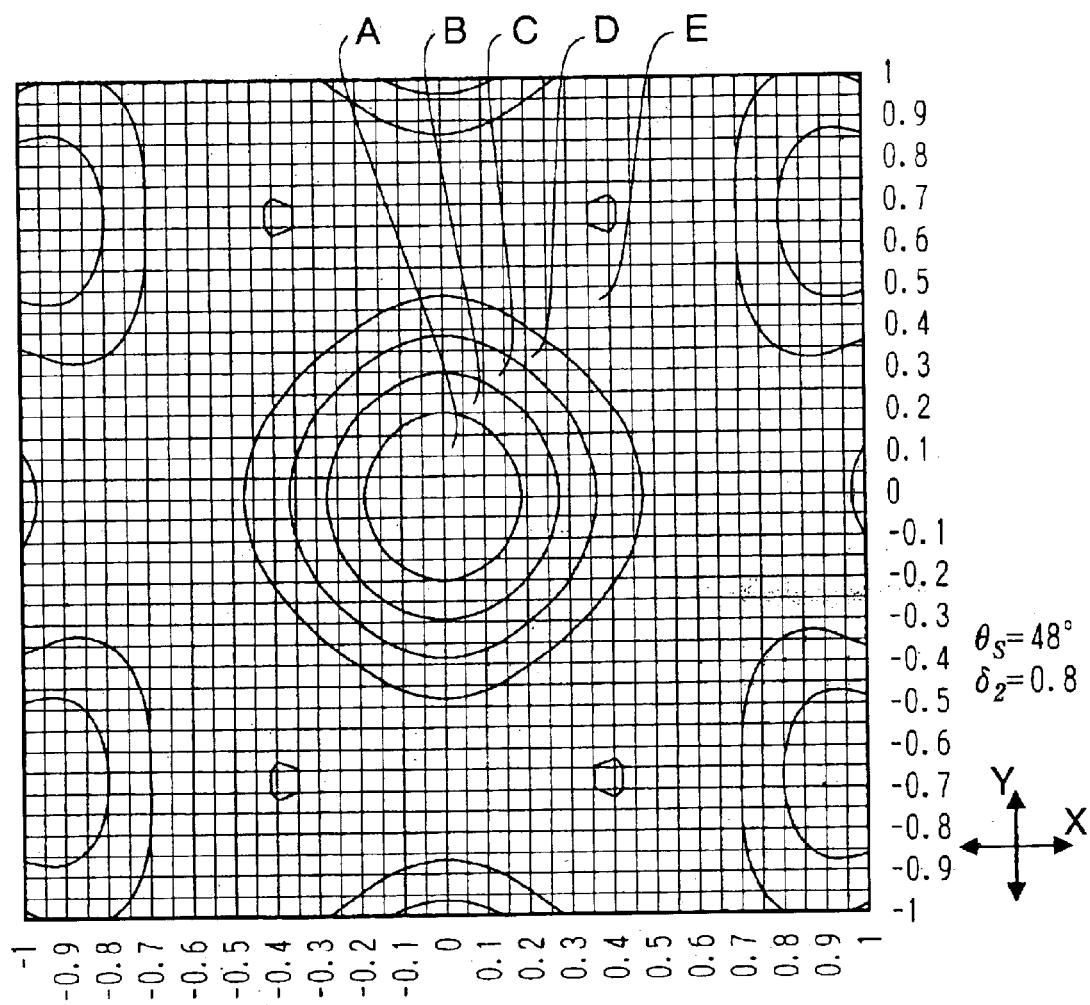
FIG. 7 shows a MTF map of the OLPF according to the embodiment when the separation angle is 48° and the a separation amount is 0.8.
Figure 8:
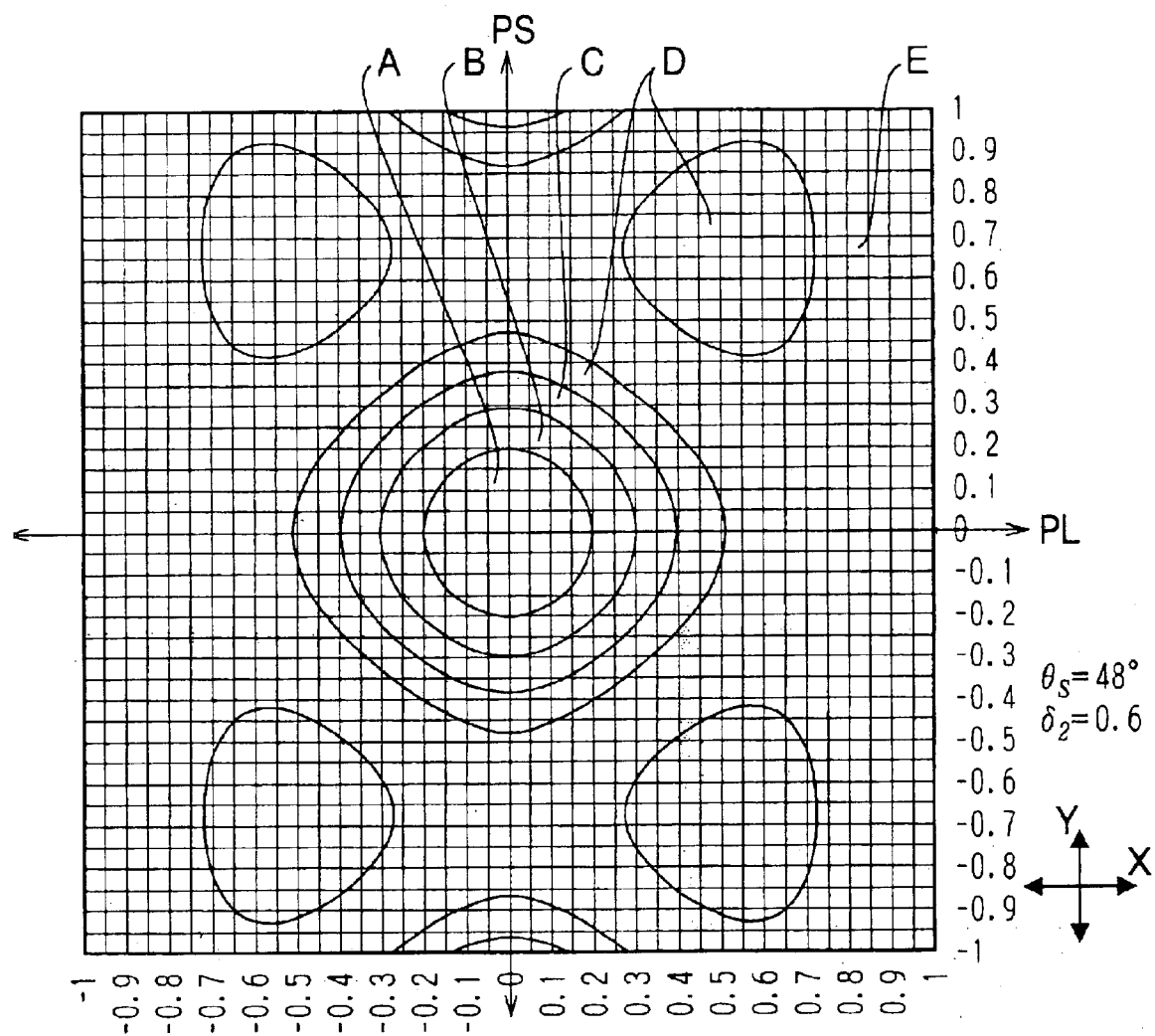
FIG. 8 shows a MTF map of the OLPF according to the embodiment when the separation angle is 48° and the a separation amount is 0.6.

The change of the cut-off function and the cut-off directionality with respect to the change of the separation amount δ2 will be explained. FIGS. 6–8 represent MTF maps of the OLPF 10 having the same separation angle of 48° and having the separation amounts δ2 of 1.0, 0.8 and 0.6, respectively. Further, in each of examples shown in FIGS. 6–8, both of the separation amounts δ1 and δ3 are set to be 1.0.

By making a comparison between FIG. 6 and FIG. 7, it is understood that the difference between the size in the PL direction and the size in the PS direction of each of the regions A–D decreases, as the separation amount δ2 decreases. Also, it is understood that a total size of the region A–D within a peripheral portion of the MTF map decreases as the separation amount δ2 decreases.

That is, by decreasing the separation amount δ2, both of the cut-off directionality and the cut-off functions are enhanced.

However, as can be seen from FIG. 8, the difference between the size in the PL direction and the size in the PS direction of each of the regions A–D becomes larger again as the separation amount δ2 is further decreased from the situation shown in FIG. 7 (i.e., δ2=0.8). Further, in the case of FIG. 8, island shaped regions D clearly appear in an area neighboring to the regions A–D positioned at a central portion of the MTF map, by which the function of eliminating the high special frequency components of the OLPF 10 is deteriorated.

It is also understood from FIG. 6 that when the separation amount δ2 is equal to the separation amount δ1 (δ3), the direction of PL coincides with the direction of the vertical direction. That is, the difference between the size in the PL direction and the size in the PS direction of each of the regions A–D starts to increase as the separation amount δ2 increases from a certain value smaller than 1.0. When the separation amount δ2 further increases from the situation shown in FIG. 6 (i.e., δ2=1.0), the cut-off directionality further deteriorates. Therefore, the separation amount δ2 is required to be smaller than the separation amount δ1 (δ3).

For this reason, in order to further enhance the performance, the OLPF 10 according to the embodiment may be configured to satisfy a condition (5).

$$0.5 \cdot δ1 \leq δ2 < 1.0 \cdot δ1 \qquad (5)$$

It should be noted that δ1 in the condition (5) can be replaced with δ3, since δ1 and δ3 are the same.

Although the present invention has been described in considerable detail with reference to certain preferred embodiments thereof, other embodiments are possible.

For example, the separation angle θs may be changed within the range of the condition (2) or the condition (3) in accordance with a characteristic of light being incident on an imaging optical system which is provided together with the OLPF in an imaging apparatus (e.g., a digital camera), and/or performance of other optical components provided in the imaging apparatus, although in the above mentioned embodiment it is explained that the optimal separation angle θs is 48°.

That is, an optimal separation angle may be determined by conducting sensory testing on images captured by the imaging apparatus.

The present disclosure relates to the subject matter contained in Japanese Patent Application No. P2003-074983, filed on Mar. 19, 2003, which is expressly incorporated herein by reference in its entirety.

What is claimed is:

1. An optical low pass filter, comprising:
   a first birefringence plate that divides an incident ray into two rays;
   a second birefringence plate that divides an incident ray into two rays; and
   a third birefringence plate that divides an incident ray into two rays,
   wherein said first birefringence plate, said second birefringence plate and said third birefringence plate are cemented to each other, light passed through said first birefringence plate passing through said second birefringence plate and then passing through said third birefringence plate, wherein a separation angle θs, representing a difference between separation directions in which adjacent ones of said first, second and third birefringence plates divide their respective incident rays, satisfies a condition:

$$46°≤θs≤60°.$$

2. The optical low pass filter according to claim 1, wherein the separation angle θs satisfies a condition:

$$46°≤θs≤52°.$$

3. The optical low pass filter according to claim 1, wherein when a separation amount, representing a distance by which the two rays divided by one of said first, second and third birefringence plates are away with respect to each other, is denoted by δ1 for said first birefringence plate, the separation amount for said second birefringence plate is denoted by δ2, and the separation amount for said third birefringence plate is denoted by δ3, said optical low pass filter satisfies a condition:

$$δ1=δ3≠δ2.$$

4. The optical low pass filter according to claim 3, wherein the separation amount for said second birefringence plate δ2 satisfies a condition:

$$0.5·δ1≤δ2<1.0·δ1.$$

5. The optical low pass filter according to claim 1, wherein the separation angle θs is defined by a following equation:

$$θs=|θ1-θ2|=|θ2-θ3|,$$

where θ1 is an angle that the separation direction in which said first birefringence plate divides its incident ray forms with respect to a horizontal direction corresponding to a longer side of a rectangular shape of an imaging element to be used together with said optical low pass filter, θ2 is an angle that the separation direction in which said second birefringence plate divides its incident ray forms with respect to the horizontal direction, and θ3 is an angle that the separation direction in which said third birefringence plate divides its incident ray forms with respect to the horizontal direction.

* * * * *